Patented Dec. 27, 1949

2,492,714

UNITED STATES PATENT OFFICE 2,492,714

MANUFACTURE OF PHOSPHORIC ACID

Marshall R. Singer, Palisades Park, N. J., assignor to Allied Chemical & Dye Corporation, a corporation of New York No Drawing. Application November 1, 1945, Serial No. 626,179

5 Claims. (Cl. 23—165)

This invention relates to manufacture of phosphoric acid.

In prior commercial practice, phosphoric acid has been made from calcium phosphate rock and sulfuric acid by a process which may be outlined as follows. Calcined phosphate rock is wet-ground with a portion of relatively weak make-up phosphoric acid withdrawn from a subsequent stage of the process. The ground material is sized, and mixed with the balance of the make-up phosphoric acid and with the sulfuric acid required to convert the calcium phosphate to phosphoric acid and calcium sulfate. This composite mass may be passed thru a series of agitated digesters which effect completion of the reaction of rock and sulfuric acid. The final digester effluent, comprising a slurry containing principally strong phosphoric acid, insoluble calcium sulfate and undigested siliceous material, is run into the first or #1 thickener of a plurality of thickeners connected in series and operated so as to separate out the solid material and recover phosphoric acid product. In the #1 thickener, the digester effluent is settled, and the clear liquid overflow constitutes the process product. The mud underflow of the first thickener is mixed with the relatively clear overflow from the #3 thickener, and the resulting slurry is fed into the #2 thickener for mud settling and separation of further phosphoric acid. The #2 thickener overflow, which is a phosphoric acid liquor of intermediate $H_3PO_4$ strength, is ordinarily used in the make-up operation in which the mass of incoming phosphate rock, some phosphoric acid and sulfuric acid is prepared for digestion. Underflow mud of the #2 thickener is mixed with overflow liquor from the #4 thickener and the resulting slurry is charged into the #3 thickener for mud settling and additional extraction of phosphoric acid values from the mud. The phosphoric acid recovery system as a whole may contain say five thickeners of similar construction, the procedural operation of the 4th and 5th thickeners being substantially the same as described in connection with the #3 thickener. Overflow of the #5 thickener is run into the #4 thickener, and the #5 thickener mud, from which most of the phosphoric acid has been extracted, is customarily filtered in a mechanical type filter. The filtrate, filter cake, water washings and any additional water needed in the recovery system are fed into the #5 thickener, the filter cake being turned to waste. Overall movement of liquid and solids thru the recovery system is countercurrent.

In operations of the type described, it has been customary to use so-called "pebble rock" as a source of phosphate. While organic impurity content is appreciable, on account of its physical characteristics, it is readily possible to calcine this rock in such a way as to effect commercially satisfactory elimination of carbonaceous material from the process. The result is that in the phosphoric acid recovery system no substantial difficulties have been encountered because of the presence of excessive amounts of carbonaceous material in the acid liquor from which the sulfate mud is being separated.

In view of changed commercial and economic conditions, it has been desirable or necessary to shift over from the use of pebble rock as a raw material to phosphate rock concentrates produced by flotation operations. These concentrates contain not only the inherent organic matter content of the raw phosphate rock but also additional quantities of organic material brought in e. g. as flotation agents in the flotation process. Furthermore, flotation concentrates differ substantially in physical form from pebble rock. The combination of organic matter content and physical characteristics of phosphate concentrates create a condition such that it is not feasible to reduce carbonaceous material content down to a satisfactory commercial minimum by the usual calcination operation. The result has been that such large amounts of carbonaceous material pass into the digestion and phosphoric acid recovery systems that settling in the thickeners is substantially interfered with and product acid withdrawn from the first thickener is so badly discolored to prohibit use of this product acid in certain other chemical operations. The discoloring carbonaceous impurities are so much more suspensible than the mud fines that substantially all the carbonaceous impurities present are worked back by the countercurrently flowing liquid into the #1 thickener from which product acid is recovered. To get rid of discoloration of the product acid, it has been necessary to subject the product acid to prolonged settling in separate tanks, this operation requiring expenditure of time and equipment, and additionally causing large loss of strong phosphoric acid because of the difficulty of effectively separating all of the phosphoric acid from the carbonaceous material collecting in the bottoms of the final sedimentation tanks.

This invention aims to provide a process the practice of which makes commercially feasible the use, as source of $P_2O_5$, of phosphatic material of relatively high carbonaceous impurity content without encountering the phosphoric acid liquor-carbonaceous impurity separation difficulty discussed above. The invention affords reduction of the suspensibility of the carbonaceous content of the phosphoric acid liquor-calcium sulfate mud mass in the recovery system to such an extent that the solid inorganic residues and the carbonaceous impurities pass in parallel thru the recovery system at about the same rates so that the carbonaceous impurities are discharged from the process along with the final calcium sulfate mud rather than collecting in the opposite end of the recovery system, i. e. in the product acid thickener.

After attempts to effect substantially coextensive settling and sedimentation of carbonaceous impurities and the solid inorganic residues customarily present in wet process phosphoric acid liquors by means of several commonly known settling agents, I found that the difficulties above described may be overcome by separating, e. g. settling, the solid inorganic residues from the phosphoric acid liquor in the presence of a suitable bentonite. My investigations show that the sought-for objectives may be accomplished by adding sodium bentonite to the slurry to be settled or filtered.

Broadly considered, bentonites may be grouped in two classes—sodium bentonite and calcium bentonite. The term "sodium bentonite" as mentioned herein refers to the amount by weight of sodium present in a bentonite as compared with the calcium content by weight, and indicates a bentonite containing by weight more sodium than calcium. Similar material containing by weight more calcium than sodium may be considered as calcium bentonite. Sodium bentonite types of material, possessing exceptional colloidal properties and high hydrophilic characteristics, are found in the Wyoming and South Dakota districts of the United States, and should be contrasted with the calcium bentonites found in California, Mississippi and the Southwest. Following are analyses of these two types of materials.

|  | Sodium Bentonite (Wyoming) | Calcium Bentonite (Mississippi) |
| --- | --- | --- |
|  | Per Cent by Weight | Per Cent by Weight |
| $SiO_2$ | 59.7 | 64.2 |
| $Fe_2O_3$ | 2.7 | 4.8 |
| $Al_2O_3$ | 21.0 | 17.1 |
| CaO | 0.96 | 1.48 |
| $Na_2O$ | 1.94 | 0.21 |
| MgO | 3.6 | 3.9 |
| $K_2O$ | 0.10 | 0.48 |
| Ca | 0.68 | 1.06 |
| Na | 1.44 | 0.16 |
| Loss on Ignition | 6.19 | 7.78 |
| Water at 110° C | 3.51 | Nil |

The reasons for the action which causes the sodium bentonites to carry carbonaceous impurities down at a rate comparable with the sedimentation of the calcium sulfate mud have not been determined. Carbonaceous impuritiy settling may be possibly brought about by coagulation or adsorption or both. Whatever the explanation may be the sodium bentonites cause satisfactory settling of carbonaceous impurities in acid medium in all stages of the recovery system regardless of the substantially differing phosphoric acid strengths which increase from a minimum in the final thickener to a maximum in the first thickener.

The quantity of bentonite to be used in any process to effect the desired precipitation of the carbonaceous impurities is dependent upon the carbonaceous matter content of the phosphatic starting material and the comparable carbonaceous content of the phosphoric acid-calcium sulfate slurry from which product phosphoric acid is recovered. Since operating conditions, such as the carbonaceous content of the starting material, the phosphoric acid liquor-solids ratios of the mass run thru the process, the $H_3PO_4$ strength of the liquor in the various stages of the process, the number of thickeners employed, and the $H_3PO_4$ strength of the ultimate acid product, may vary in commercial processes over such wide ranges it is not possible to accurately designate the quantities of bentonite which would be effective in all situations. In many instances, small-scale test runs would be desirable or necessary to determine the particular quantities of bentonite to be used for a given set of plant conditions. However, I have found that for representative large scale operations, the total amount of bentonite used in the entire phosphoric acid recovery system may range from 0.05 to 2.5 lbs. per 100 lbs. of 100% $H_3PO_4$ recovered.

While improved separation of organic impurities may be had by using the bentonite at any single point in the recovery system, I find that particularly good overall commercial results may be secured by using approximately equal quantities by weight of bentonite in each separation or settling stage of a multi-stage countercurrent decantation operation such as described. The bentonite may be charged into the process as a suspension carried in any suitable amount of water. The bentonite to be fed into any given thickener may be conveniently incorporated with the mixture which is formed from the underflow of a thickener with the overflow of a second succeeding thickener, the resulting slurry containing the added bentonite being fed into the intermediate thickener into which it is desired to introduce the bentonite.

In one particular commercial operation embodying the practice of the invention, the initial raw material employed was a phosphate rock flotation concentrate containing, before calcination, 0.62% organic impurities calculated as carbon. The process was carried out in a plant in which the acid recovery system comprised five thickeners (Dorr type), the #5 thickener being followed by an Oliver filter. The sodium bentonite, of substantially the analysis given above, was introduced in the form of a water slurry containing 5.0% by weight of bentonite, and the total amount of bentonite used was fed into the recovery system at a rate of about 2.0 lbs. per 100 lbs. of 100% $H_3PO_4$ recovered. Approximately equal quantities of bentonite were charged into the 1st, 2nd, 3rd, 4th and 5th thickeners. Aside from the use of bentonite, operation was the same as known in commercial practice, i. e. the phosphoric acid liquor-calcium sulfate mud effluent of the digester system was fed into the #1 thickener, the solids moved successively thru thickeners 1, 2, 3, 4 and 5, and then to the filter, while the filtrate of the filter plus wash water and some additional extraneous water were run into the #5 thickener, and liquid flowed back thru the recovery system countercurrent to mud travel. In the following table, Column A indicates the approximate carbon content of the respective thickeners when bentonite was not used, and Column B shows the corresponding values when proceeding in accordance with the preferred embodiment of the invention:

| Thickener | Column A | Column B |
|---|---|---|
| #1 | .065 | .001 to .005 |
| #2 | .040 | .0005 to .003 |
| #3 | .015 | .0005 to .002 |
| #4 | .010 | .0005 to .002 |
| #5 | .005 | .0005 to .001 |

The carbon quantities indicated refer to the carbon content of the overflow acid of the respective thickeners.

In the check run, from which the data of Column A were obtained, the carbon content of Oliver filter mud was less than 0.01% by weight (dry basis), and the approximately 26% $H_3PO_4$ product acid recovered from the #1 thickener was discolored and required prolonged settling in separate tanks before transfer to storage. During a two weeks' run in accordance with the invention, the carbon content of the Oliver mud varied between 0.17 and 0.37% by weight, with an average of 0.24%. Product acid recovered was clear.

I claim:

1. The process for making phosphoric acid which comprises forming, from calcium phosphate material containing carbonaceous impurities brought into said material by prior treatment thereof with flotation agents, a slurry containing phosphoric acid liquor, insoluble calcium sulfate residue and suspended carbonaceous impurities, incorporating sodium bentonite into said slurry and settling said residue from said liquor in the presence of said sodium bentonite to thereby effect separation of carbonaceous impurities from said liquor along with said residue.

2. The process for making phosphoric acid which comprises forming, from calcium phosphate material containing carbonaceous impurities brought into said material by prior treatment thereof with flotation agents, a slurry containing phosphoric acid liquor, insoluble calcium sulfate residue and suspended carbonaceous impurities, incorporating sodium bentonite into said slurry, separating said residue from said liquor by a plurality of countercurrent decantation stages, and settling residue from liquor in each stage in the presence of said sodium bentonite to thereby effect separation of carbonaceous impurities from said liquor along with said residue.

3. The process for making phosphoric acid which comprises forming, from calcium phosphate material containing carbonaceous impurities brought into said material by prior treatment thereof with flotation agents, a slurry containing phosphoric acid liquor, insoluble calcium sulfate residue and suspended carbonaceous impurities, incorporating sodium bentonite into said slurry, settling said residue from said liquor, and recovering phosphoric acid liquor by decantation, said settling being effected in the presence of said sodium bentonite in amount ranging from 0.05 to 2.5 lbs. per 100 lbs. of 100% $H_3PO_4$ recovered.

4. The process for making phosphoric acid which comprises forming, from calcium phosphate material containing carbonaceous impurities brought into said material by prior treatment thereof with flotation agents, a slurry containing phosphoric acid liquor, insoluble calcium sulfate residue and suspended carbonaceous impurities, incorporating sodium bentonite into said slurry, separating said residue from said liquor and recovering said liquor by a plurality of countercurrent decantation stages, and settling residue from liquor in each stage in the presence of approximately equal quantities of said sodium bentonite, the total amount of said incorporated sodium bentonite utilized ranging from 0.05 to 2.5 lbs. per 100 lbs. of 100% $H_3PO_4$ recovered.

5. In the process of making phosphoric acid by reacting sulfuric acid with calcium phosphate material containing carbonaceous impurities brought into said material by prior treatment thereof with flotation agents, to form a slurry containing phosphoric acid liquor, insoluble calcium sulfate, and suspended carbonaceous impurities; the step of separating insoluble calcium sulfate and suspended carbonaceous impurities from the resulting phosphoric acid liquor by a plurality of countercurrent decantation stages, which comprises incorporating sodium bentonite into the slurry formed by mixing the calcium sulfate laden underflow of one decantation stage with the phosphoric acid overflow of a succeeding decantation stage and subjecting the resulting slurry to an intermediate decantation operation.

MARSHALL R. SINGER.

REFERENCES CITED

The following references are of record in the file of this patent:

UNITED STATES PATENTS

| Number | Name | Date |
|---|---|---|
| 1,894,289 | Wood | Jan. 17, 1933 |
| 2,132,349 | Booth | Oct. 4, 1938 |
| 2,288,460 | Kane | June 30, 1942 |
| 2,345,827 | Olin | Apr. 4, 1944 |
| 2,390,400 | Taylor | Dec. 4, 1945 |